US009576570B2

(12) United States Patent
Precoda et al.

(10) Patent No.: US 9,576,570 B2
(45) Date of Patent: Feb. 21, 2017

(54) METHOD AND APPARATUS FOR ADDING NEW VOCABULARY TO INTERACTIVE TRANSLATION AND DIALOGUE SYSTEMS

(75) Inventors: Kristin Precoda, Mountain View, CA (US); Horacio Franco, Menlo Park, CA (US); Jing Zheng, Sunnyvale, CA (US); Michael Frandsen, Helena, MT (US); Victor Abrash, Montara, CA (US); Murat Akbacak, Palo Alto, CA (US); Andreas Stolcke, Berkeley, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 836 days.

(21) Appl. No.: 12/847,826

(22) Filed: Jul. 30, 2010

(65) Prior Publication Data
US 2012/0029904 A1 Feb. 2, 2012

(51) Int. Cl.
G10L 15/06 (2013.01)
G10L 15/193 (2013.01)

(52) U.S. Cl.
CPC ............ G10L 15/06 (2013.01); G10L 15/193 (2013.01); G10L 15/063 (2013.01); G10L 2015/0635 (2013.01)

(58) Field of Classification Search
CPC ........... G10L 15/063; G10L 2015/0635; G10L 15/193
USPC ............................ 704/10, 243–244, 257, 277
See application file for complete search history.

(56) References Cited

U.S. PATENT DOCUMENTS

| 4,847,619 | A | * | 7/1989 | Kato et al. ..................... 341/106 |
| 5,412,567 | A | * | 5/1995 | Karttunen ........................ 704/10 |
| 5,638,487 | A | * | 6/1997 | Chigier ........................ 704/253 |
| 5,819,220 | A | | 10/1998 | Sarukkai et al. |
| 5,983,177 | A | * | 11/1999 | Wu et al. ........................ 704/244 |
| 6,092,043 | A | * | 7/2000 | Squires et al. ................. 704/251 |
| 6,092,044 | A | * | 7/2000 | Baker et al. ................... 704/254 |
| 6,192,332 | B1 | | 2/2001 | Golding |
| 6,243,680 | B1 | * | 6/2001 | Gupta et al. ................... 704/260 |
| 6,345,245 | B1 | * | 2/2002 | Sugiyama et al. .............. 704/10 |
| 6,356,865 | B1 | | 3/2002 | Franz et al. |
| 6,374,210 | B1 | * | 4/2002 | Chu ................................... 704/9 |
| 6,418,431 | B1 | | 7/2002 | Mahajan et al. |
| 6,615,178 | B1 | | 9/2003 | Tajima |
| 6,801,893 | B1 | * | 10/2004 | Backfried et al. ............ 704/257 |

(Continued)

OTHER PUBLICATIONS

Daciuk et al. "Incremental Construction of Minimal Acyclic Finite-State Automata," Computational Linguistics, vol. 26, No. 1, Mar. 2000, pp. 3-16.*

(Continued)

Primary Examiner — James Wozniak
(74) Attorney, Agent, or Firm — Barnes & Thornburg LLP

(57) ABSTRACT

The present invention relates to a method and apparatus for adding new vocabulary to interactive translation and dialog systems. In one embodiment, a method for adding a new word to a vocabulary of an interactive dialog includes receiving an input signal that includes at least one word not currently in the vocabulary, inserting the word into a dynamic component of a search graph associated with the vocabulary, and compiling the dynamic component independently of a permanent component of the search graph to produce a new sub-grammar, where the permanent component comprises a plurality of words that are permanently part of the search graph.

20 Claims, 3 Drawing Sheets

(56) References Cited

U.S. PATENT DOCUMENTS

| | | | |
|---|---|---|---|
| 6,952,665 B1 | 10/2005 | Shimomura et al. | |
| 7,243,069 B2 | 7/2007 | Jaepel et al. | |
| 7,308,404 B2 * | 12/2007 | Venkataraman et al. | 704/255 |
| 7,337,116 B2 * | 2/2008 | Charlesworth et al. | 704/254 |
| 7,580,429 B1 * | 8/2009 | Wallach | 370/521 |
| 7,590,533 B2 * | 9/2009 | Hwang | 704/231 |
| 7,716,037 B2 | 5/2010 | Precoda et al. | |
| 7,752,051 B2 | 7/2010 | Mizutani et al. | |
| 7,756,710 B2 | 7/2010 | Franco et al. | |
| 8,078,467 B2 | 12/2011 | Wu et al. | |
| 8,090,570 B2 | 1/2012 | Waibel et al. | |
| 8,725,509 B1 * | 5/2014 | Harb et al. | 704/255 |
| 2003/0023431 A1 * | 1/2003 | Neuberger | 704/231 |
| 2003/0191626 A1 | 10/2003 | Al-Onaizan et al. | |
| 2004/0006465 A1 | 1/2004 | Phillips et al. | |
| 2004/0181392 A1 * | 9/2004 | Parikh et al. | 704/10 |
| 2005/0102141 A1 | 5/2005 | Chikuri | |
| 2005/0261910 A1 | 11/2005 | Precoda et al. | |
| 2006/0015317 A1 * | 1/2006 | Nakagawa | 704/1 |
| 2006/0015318 A1 | 1/2006 | Moore | |
| 2006/0031061 A1 | 2/2006 | Xun | |
| 2006/0100876 A1 | 5/2006 | Nishizaki et al. | |
| 2007/0083374 A1 | 4/2007 | Bates et al. | |
| 2007/0118353 A1 * | 5/2007 | Cho et al. | 704/3 |
| 2007/0265827 A1 * | 11/2007 | Wall et al. | 704/8 |
| 2008/0097742 A1 | 4/2008 | Ushioda | |
| 2008/0114583 A1 | 5/2008 | Al-Onaizan et al. | |
| 2008/0162117 A1 | 7/2008 | Bangalore et al. | |
| 2008/0235022 A1 * | 9/2008 | Bergl et al. | 704/257 |
| 2009/0132233 A1 * | 5/2009 | Etzioni | G06F 17/28 704/3 |
| 2009/0281789 A1 * | 11/2009 | Waibel et al. | 704/3 |
| 2009/0313017 A1 | 12/2009 | Nakazawa et al. | |
| 2010/0100385 A1 * | 4/2010 | Davis et al. | 704/260 |
| 2010/0299136 A1 * | 11/2010 | Tong et al. | 704/9 |
| 2011/0040559 A1 * | 2/2011 | Kim et al. | 704/231 |
| 2011/0125499 A1 * | 5/2011 | Griggs et al. | 704/251 |
| 2011/0184718 A1 * | 7/2011 | Chen | 704/2 |
| 2011/0213613 A1 | 9/2011 | Cohen et al. | |
| 2012/0029904 A1 | 2/2012 | Precoda et al. | |

OTHER PUBLICATIONS

Stadel. "Object oriented programming techniques to replace software components on the fly in a running program." ACM Sigplan Notices 26.1 (1991), Jan. 1991, pp. 99-108.*

Scharenborg, O., & Seneff. "A two-pass strategy for handling OOVs in a large vocabulary recognition task". In Interspeech: Eurospeech, 9th European Conference on Speech Communication and Technology, Sep. 2005, pp. 1669-1672.*

* cited by examiner

METHOD AND APPARATUS FOR ADDING NEW VOCABULARY TO INTERACTIVE TRANSLATION AND DIALOGUE SYSTEMS

REFERENCE TO GOVERNMENT FUNDING

This application was made with Government support under contract no. NBCHD040058 awarded by the Department of Interior. The Government has certain rights in this invention.

FIELD OF THE INVENTION

The present invention relates generally to language processing, and relates more particularly to translation and dialogue systems.

BACKGROUND OF THE DISCLOSURE

Interactive translation and dialogue systems are computer systems that converse with human users or enable conversations between human users. Such systems may be monolingual in that a "conversation" occurs between the system and a human user (e.g., a telephone-based dialogue system that provides airline flight information responsive to user commands). Such systems may also be bilingual in that the "conversation" occurs between two human users who speak different languages (in this case, the dialogue system also performs translation between languages). Although the accuracy of interactive translation and dialogue systems is improving, they may still suffer from errors and inaccuracies.

For example, both monolingual and bilingual systems may have trouble understanding a user input. One common instance of this is when a user wants to use a word that is currently unknown to the system. The word may be synonymous with a word already known to the system (e.g., the user uses the term "Madras" for a location that the system knows as "Chennai") or may be completely unknown to the system.

SUMMARY OF THE INVENTION

The present invention relates to a method and apparatus for adding new vocabulary to interactive translation and dialogue systems. In one embodiment, a method for adding a new word to a vocabulary of an interactive dialogue includes receiving an input signal that includes at least one word not currently in the vocabulary, inserting the word into a dynamic component of a search graph associated with the vocabulary, and compiling the dynamic component independently of a permanent component of the search graph to produce a new sub-grammar, where the permanent component comprises a plurality of words that are permanently part of the search graph.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for adding new vocabulary to interactive translation and dialogue systems. Some embodiments of the invention allow new words to be added to an existing system vocabulary by efficiently modifying the system's language models, translation models, pronunciation dictionary, and a corresponding recognizer's search graph.

Figure 1:
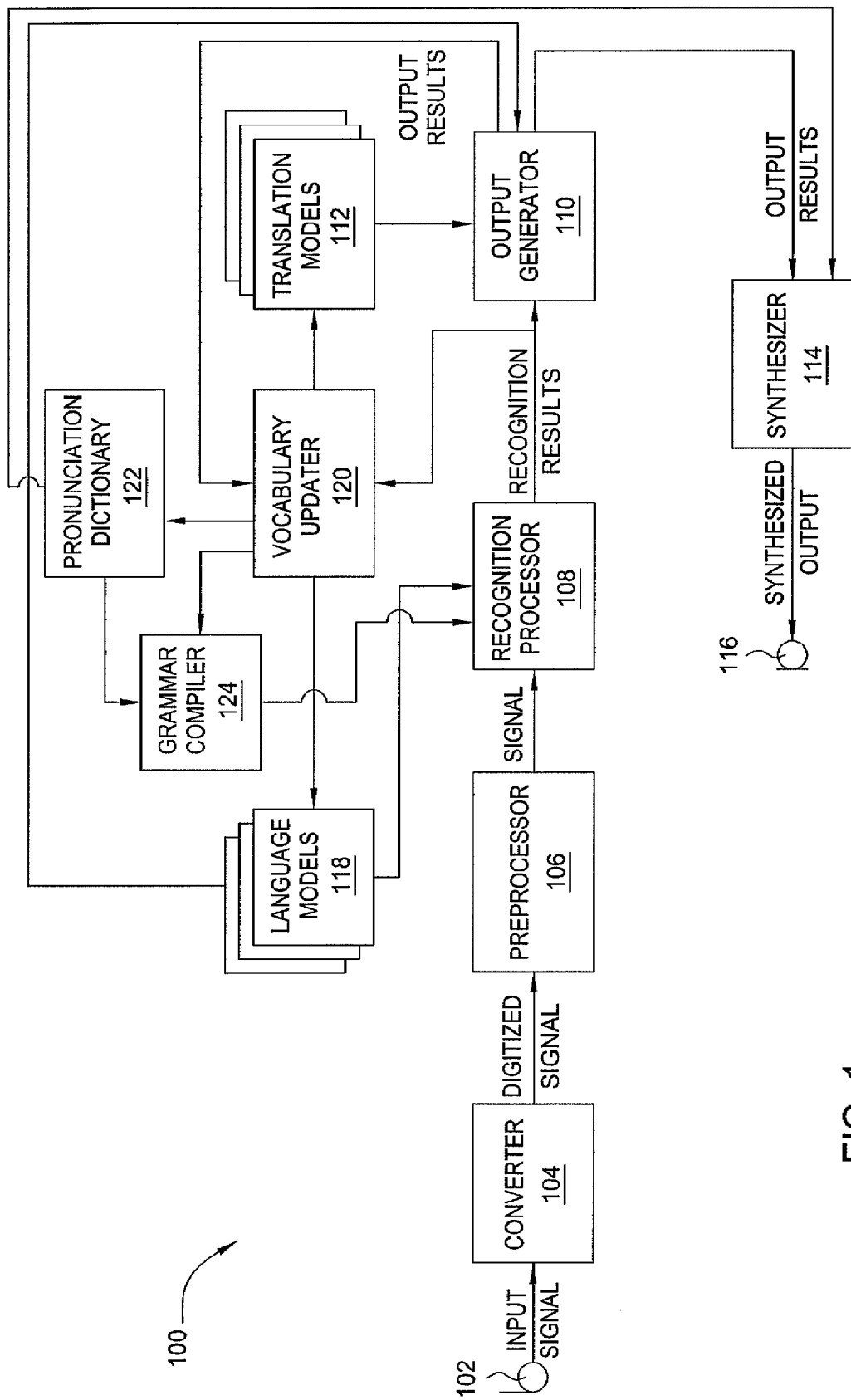
FIG. 1 is a schematic diagram illustrating one embodiment of an interactive translation and dialogue system, according to the present invention.

FIG. 1 is a schematic diagram illustrating one embodiment of an interactive translation and dialogue system 100, according to the present invention. The system 100 may comprise a stand-alone device, or may be integrated as part of a larger speech-based system.

The system 100 comprises an input device 102 that receives a signal input to the system 100. The input device may be a microphone, transducer, or other device in the case of an audio signal, or may be a keyboard, stylus, writing tablet, scanner, or other device in the case of a textual signal. The input device 102 is optionally coupled to an analog-to-digital converter 104 that processes the input signal to produce a digitized signal.

The optional analog-to-digital converter 104 is in turn coupled to an optional preprocessor 106 that preprocesses the digitized signal to facilitate subsequent recognition processing. In one embodiment, where the input signal is an audio signal, the optional preprocessor 106 is configured to perform at least one of the following on the digitized signal: noise reduction (e.g., reduce background noise), endpointing (i.e., identify start and/or endpoints of the digitized signal), channel normalization (e.g., reduce the effects of different channels and microphones), vocal tract length normalization (e.g., reduce the variability of acoustic features due to different vocal tract lengths), or other kinds of preprocessing.

The preprocessor 106 is coupled to a recognition processor 108. The recognition processor 108 is configured to recognize words and phrases (or portions of words and phrases) in the digitized signal. In one embodiment, where the input signal is an audio signal, the recognition processor 108 is a speech recognition processor, such as an automatic speech recognition (ASR) processor. Given an audio signal containing speech, ASR techniques produce recognition results comprising a textual sequence of words comprising, but not necessarily limited to, a potentially imperfect transcription of the audio signal.

The recognition processor 108 outputs the recognition results to an output generator 110. The output generator 110 generates raw output responsive to the recognition results. For example, in the case of a monolingual dialogue system, the output generator 110 may generate raw data responsive to a user's question (e.g., the arrival time of a given airline flight). In the case of a bilingual dialogue system, the output generator 110 may comprise a translator that translates the recognition results from a first language (i.e., the language of the input signal) into translation results in a second language. The output generator 110 is coupled to one or more translation models 112 and/or optional language models 118 that assist in performing the translation. The translation models 112 and language models 118 form a vocabulary for the system 100, which optionally includes other data sources (grammars, etc).

The output generator 110 then outputs the raw output to an optional synthesizer 114 that generates an output signal representing the content of the raw output. For example, in the monolingual dialogue system discussed above, the output generator 110 may output raw data regarding flight arrival time that is synthesized into the format of a response to the user (e.g., "Flight No. 28 is scheduled to land at 3:00 PM"). In the bilingual dialogue system discussed above, the output generator 110 may output translation results that are synthesized into an output signal representing the content of the input signal in the second language. In one embodiment, where the output signal is an audio signal, the optional synthesizer 114 is a speech synthesizer that synthesizes the translation results into an audio signal that represents the content of the input speech signal in the second language. In another embodiment, where the output signal is a textual signal, the translation may not need to be synthesized and can be output directly from the output generator 110. Alternatively, the optional synthesizer 114 may format the output signal. For example, the synthesizer may format raw data into a natural language response. In one embodiment, the output generator 110 and the optional synthesizer 114 are combined in a single component.

The synthesized translation is then fed to an output device 116. In one embodiment, where the output signal is an audio signal, the output device 116 is a speaker. In another embodiment, where the output signal is a textual signal, the output device 116 is a display.

In one embodiment of the present invention, the recognition processor 108 is further coupled to a vocabulary updater 120. In a further embodiment, the output generator is also coupled to the vocabulary updater 120.

The vocabulary updater 120 operates under the direction of a user to update the system's vocabulary, including the language models 118, translation models 112, and a pronunciation dictionary 122. For example, the vocabulary updater 120 may add new words to one or more language models 118 that are used by the recognition processor 108 and the output generator 110. To this end, the user may use the recognition processor 108 and/or output generator 110 to verify that updates to the vocabulary are effective. The vocabulary updater 120 may also add translations for the new words to the translation models 112 and/or pronunciations for the new words to the pronunciation dictionary 122. The language models 118 may comprise multiple sets of language models for different languages (e.g., a first set of English language models, a second set of Spanish language models, etc.). One embodiment of a method for updating the system's vocabulary is discussed in greater detail with respect to FIG. 2.

The new words are provided to the language models 118, translation models 112, and/or pronunciation dictionary 122, which in turn may be accessed by the recognition processor 108 when performing recognition processing or by the optional synthesizer 114 when formatting the output signal, as discussed above.

The system 100 also includes a grammar compiler 124, which generates updated sub-grammars for use by the recognition processor 108. To this end, the grammar compiler 124 receives inputs from the vocabulary updater 120 and the pronunciation dictionary 122.

As discussed above, the system 100 may be configured as a stand-alone device, or may be integrated as part of a larger speech-based system. In addition, the system 100 may be configured as a distributed system wherein one or more of the components discussed above comprises or is integrated as part of a separate device. For example, the recognition processor 108 may remotely access the language models 118 over a network. This allows for easy upgrade of the language models 118 and reduces the processing and memory requirements for the system 100. Alternatively, the input device 102 and/or the output device 116 may be remotely coupled to the system 100. This allows individuals in different locations to converse with each other remotely in different languages.

Although the present invention is described within the context of speech and text processing, those skilled in the art will appreciate that the concepts of the present invention can be easily extended to other types of inputs and outputs as well. For example, the input and/or output can be in video form. This may be helpful, for example, where at least one of the conversants speaks in a sign language.

Figure 2:
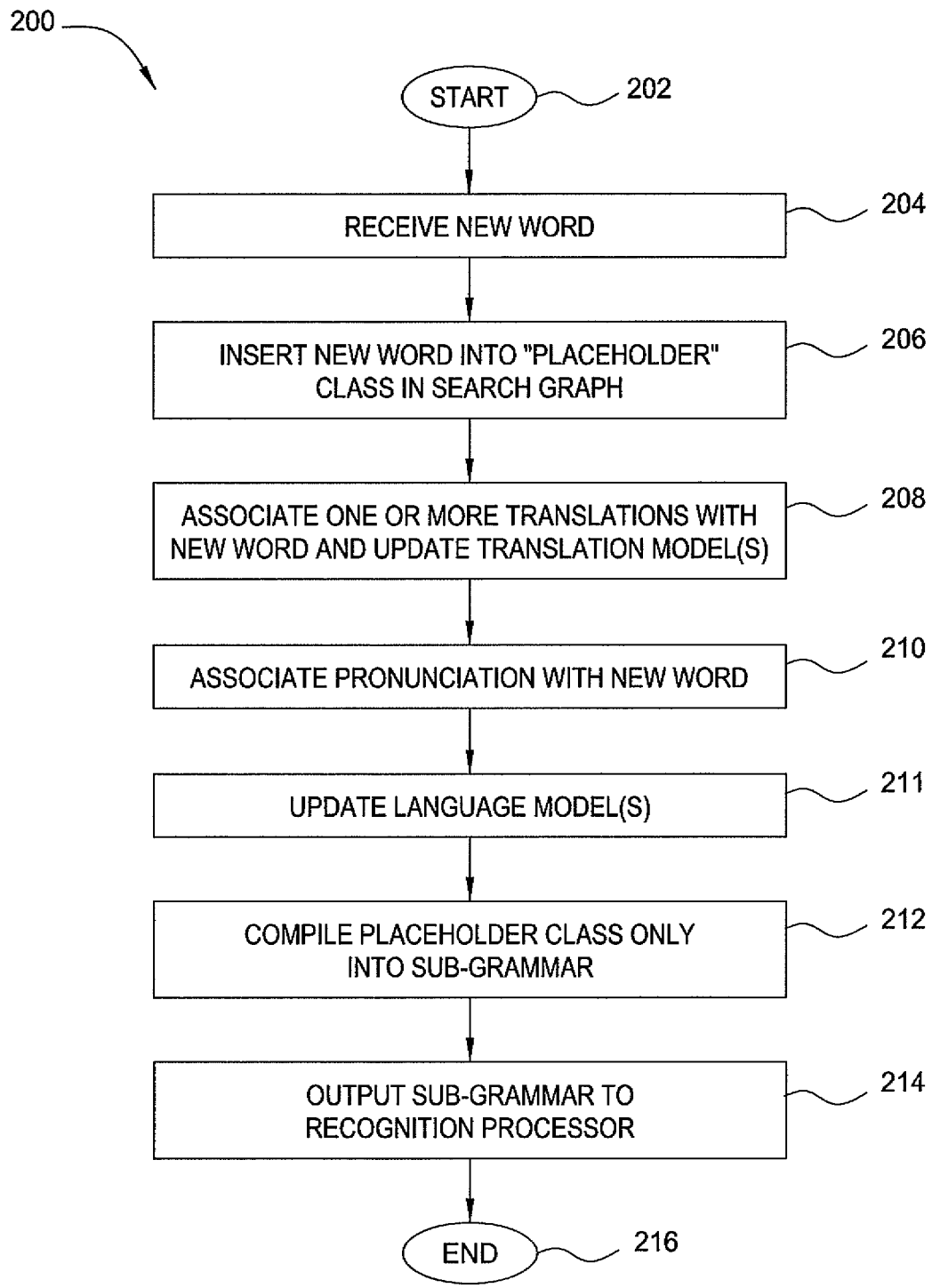
FIG. 2 is a flow diagram illustrating one embodiment of a method for adding a new word to a vocabulary, according to the present invention.

FIG. 2 is a flow diagram illustrating one embodiment of a method 200 for adding a new word to a vocabulary, according to the present invention. The method 200 may be implemented by a system such as the system 100 illustrated in FIG. 1 to enhance the quality of language translations.

The method 200 is initialized at step 202 and proceeds to step 204, where the method 200 receives at least one new word for inclusion in the vocabulary. The new word is a word that is not currently in the vocabulary. In some embodiments, the new word is to be added to a language model and a translation model. The new word may be a single word or a sentence or phrase comprising a plurality of words. In one embodiment, the new word is received from a user in connection with a command from the user to add the new word to the vocabulary. In one embodiment, the new word is received in text form (e.g., typed by the user) or in audio form (e.g., spoken by the user).

In step 206, the method 200 inserts the new word into a "placeholder" in a search graph associated with the vocabulary. The search graph comprises two main components: a permanent component that comprises a plurality of words that are permanently part of the search graph and a dynamic component that allows new words to be added (at least temporarily) to the search graph. The dynamic component of the search graph comprises at least one placeholder class inserted into the permanent component to facilitate addition of new words. Thus, a placeholder represents a class of words that is not instantiated (loaded) with the permanent component of the search graph.

In step 208, the method 200 associates one or more translations with the new word and updates the translation models accordingly. In one embodiment, at least one translation is provided by the user. In another embodiment, at least one translation is retrieved from a dictionary or another source.

In step 210, the method 200 associates a pronunciation with the new word to facilitate recognition when the new word occurs in an audio signal. In one embodiment, the pronunciation is provided by the user. In another embodiment, the pronunciation is retrieved from a dictionary (e.g., pronunciation dictionary 122). In another embodiment, the method 200 generates a plurality of potential pronunciations based on the spelling of the new word (e.g., using a letter-to-sound model such as that used by text-to-speech programs, or an automatic pronunciation generator), and then selects the potential pronunciation that best matches (e.g., based on a likelihood score) the new word as pronounced by the user (e.g., using ASR or a similar technique). In one embodiment, step 210 can occur before step 208, or can occur in parallel with step 208.

The pronunciations of the new words generated in accordance with step 210 can also be used in the text-to-speech component of a speech-to-speech translation system. A speech-to-speech translation system uses text-to-speech engines to convert translations into speech. A text-to-speech engine typically analyzes the spelling of a word and generates internal pronunciations based on some model. However, model-based pronunciation generation may have ambiguities and may not always be correct.

In step 211, the method 200 updates the language models in accordance with the new word. In step 212, the method 200 compiles (optimizes and flattens) the placeholder class only, independent of the permanent component of the search graph. Compilation results in a new sub-grammar comprising the words contained in the placeholder class.

The method 200 outputs the new sub-grammar to a recognition processor (such as the recognition processor 108 of FIG. 1) in step 214 before terminating in step 216.

The method 200 thereby adds new vocabulary to the search graph by dynamically updating subgrammars with a newly generated subgrammar comprising new words. Thus, there is no need to reload the permanent component of the search graph, which is fully flattened and optimized at the Hidden Markov Model (HMM) level before the dynamic component is instantiated and expanded. This allows the language models used by the recognition processor to be updated very quickly, as the size of the dynamic component is very small compared to the size of the permanent component. The present invention therefore combines the almost-real-time speed advantage of the fully optimized main grammar with the benefit of the short update time for the compilation of the dynamic component. Moreover, even if the dynamic component is large (i.e., contains many new words), pruning it on the fly during loading allows the update to proceed relatively quickly.

In one embodiment, the dynamic component is loaded for use in rescoring of ASR output. In a further instance of this embodiment, as described above, the dynamic component is used to enhance the accuracy of a language translation system. In this case, the new words may be instantiated as a multi-lingual "translation table" or "phrase table" that is used to supplement a main dictionary, translation table, or translation model used by the language translation system. Once the phrase table is updated, the new words or phrases contained therein may be used in different contexts.

Figure 3:
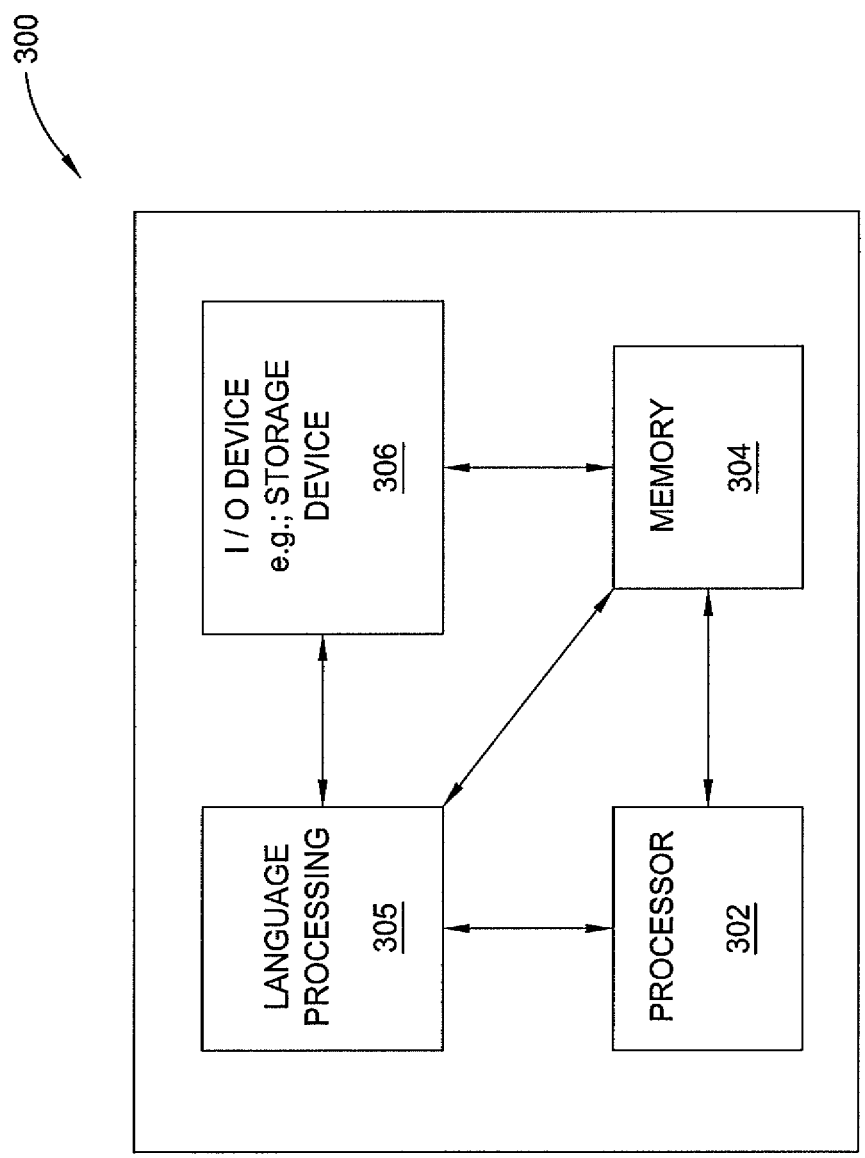
FIG. 3 is a high level block diagram of the present invention implemented using a general purpose computing device.

FIG. 3 is a high level block diagram of the present invention implemented using a general purpose computing device 300. It should be understood that embodiments of the invention can be implemented as a physical device or subsystem that is coupled to a processor through a communication channel. Therefore, in one embodiment, a general purpose computing device 300 comprises a processor 302, a memory 304, a language processing module 305, and various input/output (I/O) devices 306 such as a display, a keyboard, a mouse, a modem, a microphone, speakers, and the like. In one embodiment, at least one I/O device is a storage device (e.g., a disk drive, an optical disk drive, a floppy disk drive).

Alternatively, embodiments of the present invention (e.g., language processing 305) can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the language processing module 305 for conducting an interactive dialogue described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for adding a new word to a vocabulary of an interactive computing system comprising one or more computing devices, the method comprising, with the interactive computing system:
   receiving a first input signal, the first input signal comprising speech;
   generating a recognition result comprising text corresponding to at least a portion of the input signal;
   with the recognition result, identifying a new word to add to the vocabulary of the interactive computing system, the vocabulary comprising a compiled component and an uninstantiated placeholder class in a search graph;
   instantiating the placeholder class with the new word;
   compiling the instantiated placeholder class independently of the compiled component of the vocabulary;
   receiving a second input signal, the second input signal comprising speech; and
   comparing the instantiated placeholder class to a portion of the second received input signal.

2. The method of claim 1, further comprising identifying a pronunciation for the new word; and associating the pronunciation with the new word prior to the compiling.

3. The method of claim 2, further comprising receiving the pronunciation from a user.

4. The method of claim 2, further comprising generating a plurality of potential pronunciations based on a spelling of the new word; and selecting one of the plurality of potential pronunciations that best matches the new word as pronounced by a user.

5. The method of claim 1, further comprising:
   associating a translation with the new word.

6. The method of claim 5, wherein the associating further comprises: receiving the translation from a user.

7. The method of claim 5, wherein the associating further comprises: retrieving the translation from a dictionary.

8. The method of claim 1, wherein compiling the instantiated placeholder class produces a new sub-grammar, and the method comprises outputting the new sub-grammar to a recognition processor.

9. The method of claim 1, wherein compiling the instantiated placeholder class produces a dynamic component of a search graph, and wherein the dynamic component and the compiled component are different components of the search graph.

10. The method of claim 1, wherein the compiled component comprises a main grammar of the vocabulary, compiling the instantiated placeholder class produces a sub-grammar of the vocabulary, and the sub-grammar is smaller in size than the main grammar.

11. The method of claim 1, wherein compiling the instantiated placeholder class produces a dynamic component of the vocabulary, and the method comprises rescoring the recognition result using the dynamic component of the vocabulary.

12. A language processing module for adding a new word to a vocabulary, the language processing module embodied in one or more non-transitory computer readable storage media and configured to cause a computing device to:
    receive a first input signal, the first input signal comprising speech;
    generate a recognition result comprising text corresponding to at least a portion of the input signal;
    with the recognition result, identify a new word to add to the vocabulary of the interactive computing system, the vocabulary comprising a compiled component and an uninstantiated placeholder class in a search graph;
    instantiate the placeholder class with the new word;
    compile the instantiated placeholder class independently of the compiled component of the vocabulary;
    receive a second input signal, the second input signal comprising speech; and
    compare the instantiated placeholder class to a portion of the second received input signal.

13. The language processing module of claim 12, further comprising: identifying a pronunciation for the new word; and associating the pronunciation with the new word prior to the compiling.

14. The language processing module of claim 13, wherein the identifying comprises receiving the pronunciation from a user.

15. The language processing module of claim 13, wherein the identifying comprises: generating a plurality of potential pronunciations based on a spelling of the new word; and;
    selecting one of the plurality of potential pronunciations that best matches the at least one word as pronounced by a user.

16. The language processing module of claim 12, further comprising: associating a translation with the new word.

17. The language processing module of claim 16, wherein the associating comprises: receiving the translation from a user.

18. The language processing module of claim 16, wherein the associating comprises: retrieving the translation from a dictionary.

19. The language processing module of claim 12, further comprising: outputting a new subgrammar to a recognition processor.

20. An interactive dialogue system, the system comprising an input device configured to receive a first signal, wherein the first signal comprises speech; and
    a language processing module embodied in one or more non-transitory computer readable storage media, the language processing module configured to cause a computing device of the interactive dialogue system to:
    generate a recognition result compiling text corresponding to at least a portion of the received first signal; and
    with the recognition result:
        identify a new word to add to the vocabulary of the interactive computing system, the vocabulary comprising a compiled component and an uninstantiated placeholder class in a search graph;
        instantiate the placeholder class with the new word;
        compile the instantiated placeholder class independently of the compiled component of the vocabulary;
        receive a second signal, the second signal comprising speech; and
        compare the instantiated placeholder class to a portion of the second received signal.

* * * * *